UNITED STATES PATENT OFFICE.

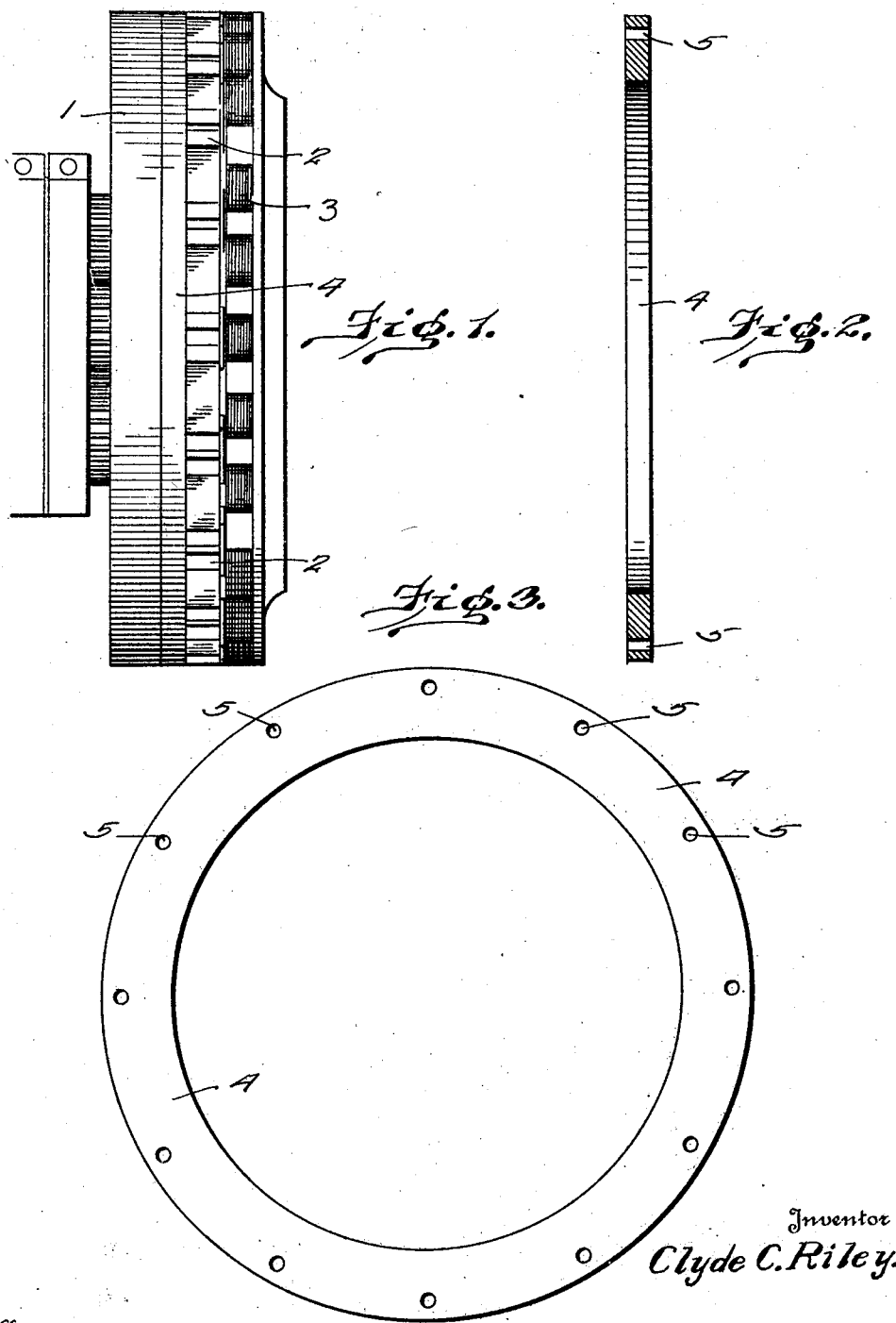

CLYDE C. RILEY, OF GOSHEN, INDIANA.

FLYWHEEL FOR AUTOMOBILES.

1,406,283. Specification of Letters Patent. Patented Feb. 14, 1922.

Application filed April 8, 1921. Serial No. 459,777.

*To all whom it may concern:*

Be it known that I, CLYDE C. RILEY, a citizen of the United States, residing at Goshen, in the county of Elkhart and State of Indiana, have invented a new and useful Flywheel for Automobiles, of which the following is a specification.

The object of my invention is to provide an improved fly wheel for automobiles, as illustrated in the accompanying drawings, in which:—

Figure 1 is a side elevation of a fly wheel made in accordance with my invention;

Fig. 2 is a sectional edge view of member 4; and

Fig. 3 is a side elevation of same.

Like numerals designate like parts in each of the views.

Referring to the accompanying drawings, I provide a fly wheel 1, having a novel heavy ring 4 inserted in place of the conventional spacers between the magnets 3 and the wheel portion 1. Ring 4 is provided with spaced orifices 5, for securing it in place by suitable fastening means. By providing the ring 4, which is an element weighing approximately 18 pounds, the wheel is properly balanced, resulting in a more flexible control of the motor, member 4 replacing the spacers heretofore used on fly wheels of the Ford type.

What I claim is:

The combination with a fly wheel of the Ford type of a heavy ring secured within said fly wheel and replacing the spacers conventionally utilized, whereby to properly balance the fly wheel and afford a more flexible control of the motor.

CLYDE C. RILEY.